G. R. KITTLE.
PROCESS FOR CASTING HOLLOW BALLS.
APPLICATION FILED AUG. 17, 1915.

1,247,545.

Patented Nov. 20, 1917.

Witnesses
H. H. Rybrand
George E. Edelin

Inventor
Gilbert R. Kittle
By H. H. Bliss
Attorney

UNITED STATES PATENT OFFICE.

GILBERT R. KITTLE, OF COLUMBUS, OHIO, ASSIGNOR TO THE JEFFREY MANUFACTURING COMPANY, OF COLUMBUS, OHIO, A CORPORATION OF OHIO.

PROCESS FOR CASTING HOLLOW BALLS.

1,247,545.   Specification of Letters Patent.   Patented Nov. 20, 1917.

Application filed August 17, 1915.  Serial No. 45,937.

*To all whom it may concern:*

Be it known that I, GILBERT R. KITTLE, a citizen of the United States, residing at Columbus, in the county of Franklin and State of Ohio, have invented certain new and useful Improvements in Processes for Casting Hollow Balls, of which the following is a specification, reference being had therein to the accompanying drawing.

This invention relates to a method for casting hollow metal balls. The object is to provide a series of steps which will result in a ball that will have a perfectly smooth exterior spherical surface and have its metal free from the internal strains that result in the cooling of a solid casting, and will have all parts of the surface rigidly held in place.

As many of the initial steps are similar to those followed in ordinary foundry practice, it is not necessary to here describe them in detail. Suffice it to say that I form a mold with a spherical cavity, and, in conjunction with this, use a baked spherical core which is carried by a core extension or support which rests in a core print in the sand. If the ball is to be large and heavy, I provide two diametrically opposite supports or extensions which rest in suitable prints. Each core support or extension has, at its inner end, next to the spherical core, an inwardly narrowing conical part, and immediately outside of this a radial enlargement, preferably of the shape of a flattened sphere, and, outside of this, a cylindrical part. The inner tapering part of the extension is of less diameter than the outer cylindrical part, and the intermediate part is wider than both of them.

The core and its supporting extension are suitably positioned in the mold, in the usual manner, and then the molten metal for the ball is poured in in any well known way.

Figure 1:
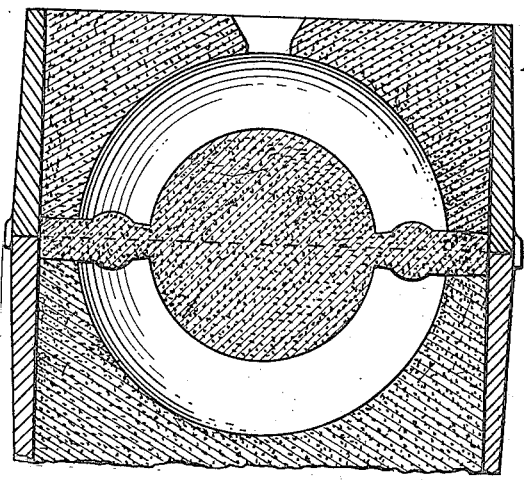
Figure 1 shows more or less conventionally a mold having the exterior and the interior parts in position for the forming of the main part of the ball.

Fig. 1 conventionally illustrates the parts prior to the pouring of the metal.

Figure 2:
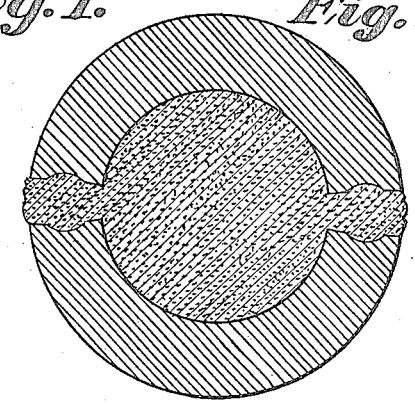
Fig. 2 shows the casting after it has been formed.
Figure 3:
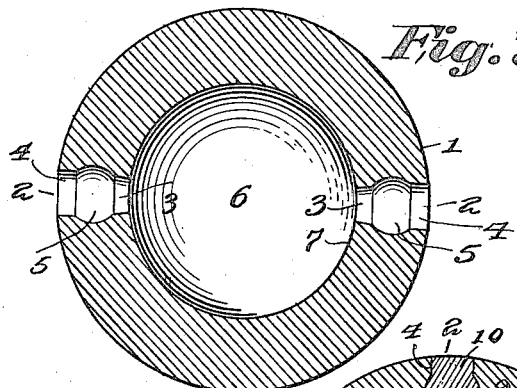
Fig. 3 illustrates it after the core parts have been cleaned out.

After the casting has cooled, the mold opened, and the ball removed, the latter and its core are shown in Fig. 2. Then the core sand is removed by any suitable tools and is completely cleaned out by rumbling in a rattler, or similar mechanism, the cleaned ball being shown in Fig. 3.

At this time the ball has the outer surface 1, which is completely spherical, except at the outer end of the aperture or apertures 2. The aperture 2 is of the shape above set forth when describing the core extension which produces it. That is to say, it has an inner conical part 3, an outer cylindrical part 4, and an intermediate widened part 5.

The interior of the ball being hollow (the chamber being shown at 6), the thickness of the metal is reduced so that at any section through the center it is annular in shape extending from the inner surface at 7 to the outer surface at 1.

In cooling this metal contracts uniformly, the absence of metal at the center permitting the formation of a homogeneous texture at all places between the two surfaces 1 and 7.

Figure 4:
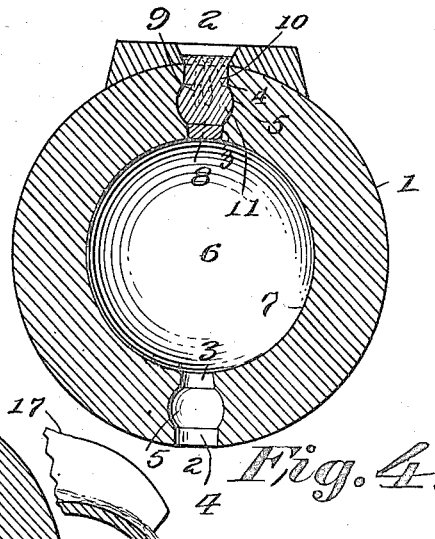
Fig. 4 shows one method for closing the aperture or apertures left by the core supports.
Figure 5:
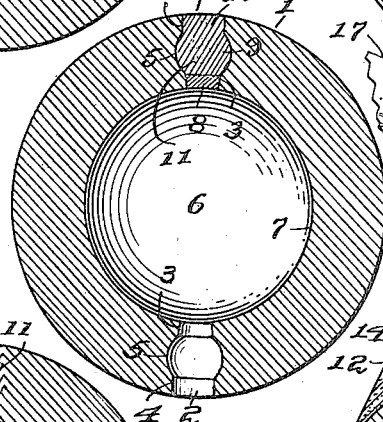
Fig. 5 shows the resulting plug or closure.

The aperture 2 is partly filled by a refractory plug 8 and partly by a metal plug 9. The refractory plug is, here, a conical core which is first pressed tightly into the conical part of the aperture near the inner surface 7, this forming a cavity with closed bottom and sides. The ball is then turned to have this aperture positioned vertically and open upward. Then molten metal, similar to that used in forming the ball itself, is poured into the cavity outside of the refractory plug 8, as shown in Fig. 4. After the metal has cooled and become hard the part outside of the surface of the sphere is removed. This plug has the outer narrower part 10 and the inner expanded part 11 corresponding to the above specified sections of the aperture.

The plug 8 prevents any molten metal from entering the interior chamber 6, and the laterally widened part 11 of the metal plug prevents the escape outward of the metal part 9, and also locks in place the refractory part.

I desire to secure, however, a closer fit and a firmer union of the plug metal with the metal of the wall of the ball, and also to have the two masses of metal distributed as homogeneously as possible. I join the contacting surfaces by effecting a union of the nature of a welding. To do this I pour the metal in a different way from that above described and illustrated in Fig. 4.

Figure 6:
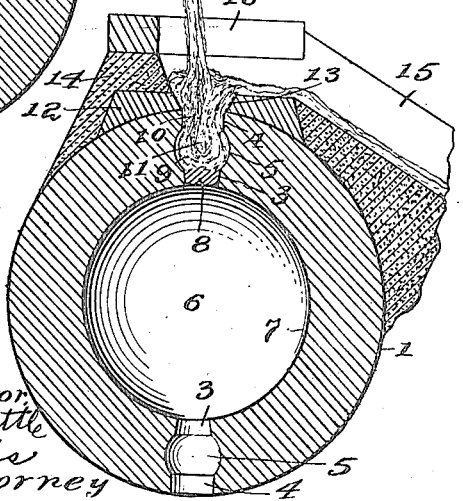
Fig. 6 shows a modification of what is illustrated in Fig. 4.
Figure 7:
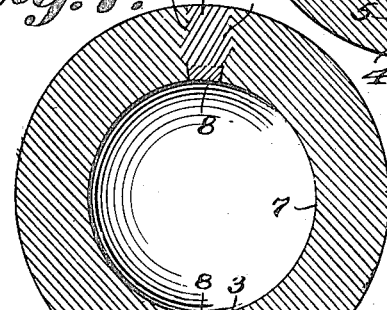
Fig. 7 illustrates the article resulting from the procedure shown in Fig. 6.

In Fig. 6 I have shown the devices for this modified way of forming the plug. 12 indicates a pouring gate, the bottom of which is concave and fits the surface of the ball. 14 indicates a mass of sand which is arranged to form a dam above and around the gate and around the throat 13. On one side there is a spillway 15 to permit the flowing off of surplus metal. At 16 there is a weight to hold the gate and sand firmly in position. Molten metal is then poured into the cavity, as from a ladle 17. The pouring is not stopped as soon as a sufficient quantity of metal has entered the cavity to fill it. The flowing of the metal is allowed to continue for a period of time, and that which rises and overflows escapes by the spillway 15. This continued flowing of the metal soon heats highly the adjacent walls of the ball. And the heating is enhanced by the shape of the walls of the aperture, particularly of the spherical or widened part at 5, as there is caused a whirling or vortex action of the hot fluid, so that it sweeps the walls of the passage and operates to rapidly raise the heat.

The flow of the metal continues and the heating is kept up until all the metal adjacent to the aperture has become so hot as to insure a welding or intimate union of the two bodies. When the plug or aperture-closing part has become cold it has not shrunk away from the metal of the ball, for that metal has also been highly heated, and follows the plug metal in cooling. And the tightening is further insured by having the mass of metal in the gateway at 13 sufficently deep to supply enough metal and heat to prevent undue contraction.

After the plug or closure has been cooled the metal projecting beyond the outer surface is cut off and smoothed to spherical shape by emery grinding or otherwise.

If two or more apertures are formed by the core supports they are each filled and sealed in the way above described.

I am aware that it has been proposed to electrically weld plugs in the apertures of hollow balls. But the purpose of the present method is to insure a perfect locking of the plug against being broken or rattled loose. In case the heated surfaces of the ball and plug should be imperfectly joined by the welding, the plug is still mechanically and positively locked against displacement. The heating which I attain at the time the metal is poured in the aperture is not only for the purpose of effecting a union between the two masses of metal, but also for rendering the structure of the plug and the neighboring parts of the wall of the ball as homogeneous as possible.

What I claim is:

1. The herein-described method for making and closing a hollow cast metal ball which is empty after being closed, it consisting in first forming a hollow casting externally sphere-shaped with an aperture through the casting, the wall of which aperture is constituted of a continuously integral mass of the metal, pouring molten metal into the said aperture until the solid metal of said wall is heated high enough to weld the molten material, preventing the escape of molten metal through the inner end of the aperture, and causing a part thereof to flow radially upward and escape from said aperture during the act of pouring.

2. The herein-described process for making and closing a hollow cast metal ball which is empty after being closed, it consisting in first forming a hollow sphere-shaped casting with an aperture extending from the interior chamber to the outer surface and having a wall entirely surrounding it which is an integral part of the casting, and then introducing into the aperture molten metal and forming therewith a closure which as an entirety is positively locked in the aperture and the surface portions of which are joined by welding them to the metal of the said integral wall.

3. The herein-described method for making and closing a hollow cast metal ball which is empty after being closed, it consisting in first forming a hollow casting externally sphere-shaped with an aperture through the casting, the wall of which aperture is a mass of metal continuously integral with the said casting, pouring molten metal into the said aperture, preventing the escape thereof through the inner end of the aperture, continuing to pour molten metal into the upper part of the aperture after it has been filled, allowing the surplus metal to flow away from the upper end of the aperture until the metal of said wall around the aperture is heated high enough to weld with the molten metal, then stopping the pouring of metal and causing the charge thereof remaining in the aperture to cool with its peripheral parts welded in all directions radial to the axis of the aperture with the metal of the said surrounding wall.

4. The herein described process for the manufacture of a hollow cast metal ball, it consisting in first forming a hollow casting externally sphere-shaped with an aperture through the casting having a narrow outer part, a narrow inner part, and an intermediate wider part, pouring molten metal into the wider part and to the outer narrow part, preventing said metal from passing through the inner narrow part, cooling and hardening such molten metal while in the aperture, and forming a plug or closure having a wider inner part which is locked against displacement either outward or inward.

5. The herein described process for the manufacture of a hollow cast ball, it consisting in first forming a hollow casting which is externally sphere-shaped with an aperture through the metal having a narrower part near the external surface and an inner wider part, pouring molten metal into the said aperture, preventing the said metal from flowing into the chamber in the casting, allowing the molten metal to cool and harden in the outer narrower and in the inner wider sections of the aperture to form a positively locked plug or closure at the surface of the ball.

6. The herein described process for the manufacture of a hollow cast metal ball, it consisting in first forming a hollow casting externally sphere-shaped with an aperture having an inner tapered section, an intermediate wider section, and an outer section narrower than the intermediate section, inserting a plug or stopper in the inner section, filling the intermediate and outer sections with molten metal, and hardening said metal to form a positively locked plug or closure.

7. The herein described process for the manufacture of a hollow cast metal ball, it consisting in first forming a hollow casting externally sphere-shaped with an aperture through the casting, then inserting a plug or stopper in the inner part of said aperture, then filling the outer part of said aperture with molten metal, and forming a cast plug with its outer end shaped to conform to the outer external surface of the ball.

In testimony whereof, I affix my signature, in presence of two witnesses.

GILBERT R. KITTLE.

Witnesses:
H. L. RAUSCH,
DUDLEY T. FISHER.